US011652965B2

(12) United States Patent
Meier et al.

(10) Patent No.: US 11,652,965 B2
(45) Date of Patent: May 16, 2023

(54) METHOD OF AND SYSTEM FOR PROJECTING DIGITAL INFORMATION ON A REAL OBJECT IN A REAL ENVIRONMENT

(71) Applicant: Apple Inc., Cupertino, CA (US)

(72) Inventors: Peter Meier, Munich (DE); Mohamed Selim Ben Himane, Milpitas, CA (US); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 17/028,360

(22) Filed: Sep. 22, 2020

(65) Prior Publication Data
US 2021/0076014 A1 Mar. 11, 2021

Related U.S. Application Data

(63) Continuation of application No. 14/758,121, filed as application No. PCT/EP2012/077060 on Dec. 28, 2012, now Pat. No. 10,819,962.

(51) Int. Cl.
H04N 9/31 (2006.01)
H04N 5/225 (2006.01)
H04N 13/128 (2018.01)
G01B 11/24 (2006.01)
G01B 11/25 (2006.01)
(Continued)

(52) U.S. Cl.
CPC ........... *H04N 9/3185* (2013.01); *G01B 11/24* (2013.01); *G01B 11/25* (2013.01); *H04N 5/2256* (2013.01);
(Continued)

(58) Field of Classification Search
None
See application file for complete search history.

(56) References Cited

U.S. PATENT DOCUMENTS 5,313,234 A 5/1994 Edmonson
7,433,024 B2 10/2008 Garcia
(Continued)

FOREIGN PATENT DOCUMENTS

CN 102693005 A 9/2012
EP 2071399 A1 6/2009
(Continued)

OTHER PUBLICATIONS

Bimber et al., "Spatial Augmented Reality: Merging real and virtual worlds," A K Peters LTD, 2005.
(Continued)

*Primary Examiner* — Bao-Luan Q Le
*Assistant Examiner* — Danell L Owens
(74) *Attorney, Agent, or Firm* — Blank Rome LLP

(57) ABSTRACT

A method of projecting digital information on a real object in a real environment includes the steps of projecting digital information on a real object or part of a real object with a visible light projector, capturing at least one image of the real object with the projected digital information using a camera, providing a depth sensor registered with the camera, the depth sensor capturing depth data of the real object or part of the real object, and calculating a spatial transformation between the visible light projector and the real object based on the at least one image and the depth data. The invention is also concerned with a corresponding system.

20 Claims, 9 Drawing Sheets

(51) Int. Cl.
  *H04N 13/15*  (2018.01)
  *H04N 5/33*  (2023.01)
  *H04N 13/257*  (2018.01)
  *H04N 13/00*  (2018.01)

(52) U.S. Cl.
  CPC ........... *H04N 5/332* (2013.01); *H04N 9/3191* (2013.01); *H04N 9/3194* (2013.01); *H04N 13/128* (2018.05); *H04N 13/15* (2018.05); *H04N 13/257* (2018.05); *H04N 2013/0081* (2013.01)

(56) References Cited

U.S. PATENT DOCUMENTS

| | | | |
|---|---|---|---|
| 8,150,142 | B2 | 4/2012 | Freedman |
| 8,172,407 | B2 | 5/2012 | Lim |
| 8,405,680 | B1* | 3/2013 | Cardoso Lopes ....... G06T 19/00 345/426 |
| 8,442,016 | B1 | 5/2013 | Lee |
| 9,229,584 | B2 | 1/2016 | Ide |
| 9,275,302 | B1 | 3/2016 | Yan |
| 2003/0071975 | A1 | 4/2003 | Fujimori |
| 2004/0105573 | A1 | 6/2004 | Neumann |
| 2004/0263802 | A1 | 12/2004 | Seki |
| 2006/0077354 | A1 | 4/2006 | Goik |
| 2008/0187730 | A1 | 8/2008 | Nozaki |
| 2009/0147239 | A1 | 6/2009 | Zhu |
| 2010/0111370 | A1 | 5/2010 | Black |
| 2011/0176007 | A1 | 7/2011 | Ding |
| 2011/0275409 | A1 | 11/2011 | Lee |
| 2012/0113401 | A1 | 5/2012 | Yamazaki |
| 2012/0188289 | A1 | 7/2012 | Lin |
| 2012/0274745 | A1 | 11/2012 | Russell |
| 2013/0069940 | A1* | 3/2013 | Sun ....................... G06T 19/006 345/419 |
| 2013/0215235 | A1 | 8/2013 | Russell |
| 2013/0229396 | A1 | 9/2013 | Huebner |
| 2014/0056507 | A1 | 2/2014 | Doyle |
| 2014/0085600 | A1 | 3/2014 | Pletcher |
| 2014/0139426 | A1 | 5/2014 | Kryze |
| 2014/0168261 | A1* | 6/2014 | Margolis ................. A63F 13/65 345/633 |

FOREIGN PATENT DOCUMENTS

| | | |
|---|---|---|
| EP | 2453643 A1 | 5/2012 |
| JP | 2001320652 A | 11/2001 |
| JP | 2008203490 A | 9/2008 |
| JP | 2010066644 A | 3/2010 |
| JP | 2010078974 A | 4/2010 |
| JP | 2010243890 A | 10/2010 |
| JP | 2011147125 A | 7/2011 |
| JP | 2012103113 A | 5/2012 |
| WO | 0154110 A1 | 7/2001 |

OTHER PUBLICATIONS

Bimber, et al., "Enabling view-dependent stereoscopic projection in real environments," Proceedings of the 4th IEEE/ACM International Symposium on Mixed and Augmented Reality, 14-23.

Extend3D (from Website 9.12.2012 http://www.extend3d.de/en/solutions/design/).

Fuchs et al., "Augmented Reality Visualization for Laparoscopic Surgery," Proceedings of the 1st International Conference on Medical Image Computing and Computer-Assisted Intervention, Oct. 1998, 10 pages.

International Search Report received in PCT Application No. PCT/EP2012/077060, dated Nov. 19, 2013.

Jamie Shotton et al: "Real-time human pose recognition in parts from single depth images," Communications of Teh ACM, Association for Computing Machinery, ICN, United States, vol. 56, No. 1, Jan. 1, 2013 (Jan. 1, 2013), pp. 116-124, XP058010058, ISSN: 0001/0782, DOI: 10.1145/2398356.2398381.

Kolb, Andreas, et al., "Time-of-Flight Sensors in Computer Graphics," Eurographics 2009.

Korostelev, Michael, "Performance Evaluation for Full Three-Dimensional Projector Calibration Methods in Spatial Augmented Reality," Aug. 2011 (Aug. 1, 2011), pp. 1-101.

Kortgen et al., "3D Shape Matching with 3D Shape Contexts," Retrieved from http://cg.tuwien.ac.at/hostings/cescg/CESCG-2003/MKoertgen/paper.pdf, Dec. 27, 2012.

Kurz et al., "Laser Pointer Tracking in Projector-Augmented Architectural Environments," Mixed and Augmented Reality, 2007, Nov. 13, 2007, pp. 19-26.

Michael Korostelev, "Performance Evaluation for Full Three-Dimensional Projector Calibration Methods in Spatial Augmented Reality," Aug. 1, 2011, http://digital.library.temple.edu/utils/getfile/collection/p245801coll10/id/213116/filename/214991.pdf#toolbar=1&navpanes=1, pp. 1-101.

Office Action received in Chinese Patent Application No. 201280078216.9, dated Apr. 19, 2017.

Office Action received in Chinese Patent Application No. 201280078216.9, dated Jan. 4, 2018.

Office Action received in Chinese Patent Application No. 201280078216.9, dated Jul. 27, 2016.

Office Action received in European Patent Application No. 12816676.6, dated Apr. 4, 2017.

Office Action received in Japanese Patent Application No. 2015-549997, dated Apr. 17, 2017.

Office Action received in Japanese Patent Application No. 2015-549997, dated Jul. 25, 2016.

Raskar et al., "Table-top spatially-augmented reality: brininger physical models to life with projected imagery," Augmented Reality, 1999 (IWAR'99) Proceedings. 2nd IEEE and ACM International Workshop on. IEEE, 1999.

Rekimoto et al., "Augmented surfaces: a spatially continuous work space for hybrid computing environments," Proceedings of the SIGCHI conference on Human factors in computing systems: the CHI is the limit. ACM, 1999.

Rusinkiewicz, S., et al., "Efficient Variants of the ICP Algorithm," Third International Conference on 3D Digital Imaging and Modeling, May-Jun. 2001, pp. 1-8.

Siltanen, Sanni, "Theory and applications of marker-based augmented reality," Espoo 2012, VTT Science 3, http://www.vtt.fi/inf/pdf/science/2012/S3.pdf.

* cited by examiner

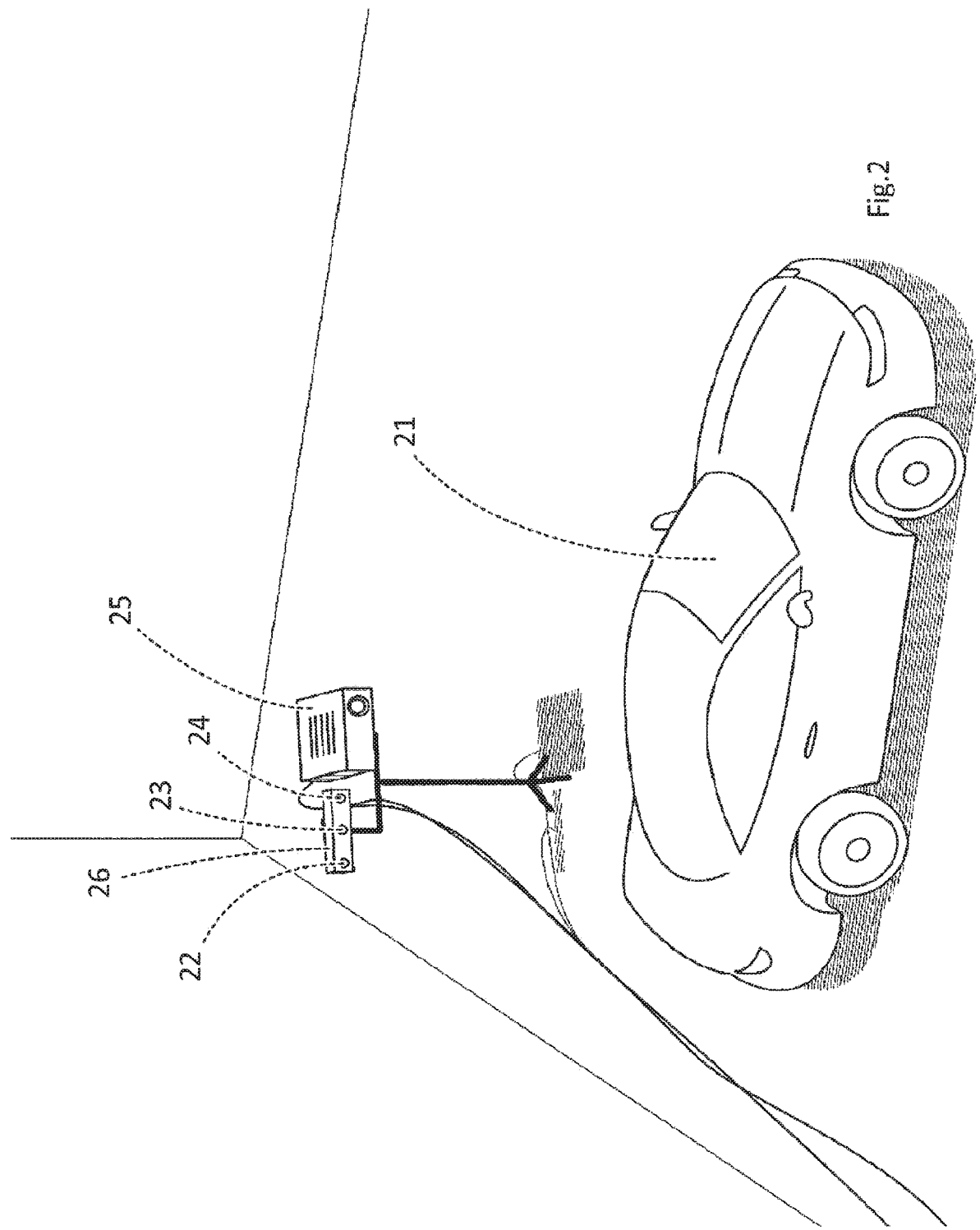

METHOD OF AND SYSTEM FOR PROJECTING DIGITAL INFORMATION ON A REAL OBJECT IN A REAL ENVIRONMENT

This application is entitled to the benefit of and incorporates by reference essential subject matter disclosed in U.S. application Ser. No. 14/758,121, filed on Jun. 26, 2015, and PCT Application No. PCT/EP2012/077060, filed on Dec. 28, 2012.

BACKGROUND

1. Technical Field

The invention is related to a method of and system for projecting digital information on a real object in a real environment. Further, the invention is related to a computer program product comprising software code sections for performing the method when running on a computer system.

2. Background Information

Augmented reality (AR) systems could enhance a real environment by directly visually augmenting the real environment by computer-generated digital information. For example, such digital information is virtual information for augmenting visual impressions of the real environment. Typical applications are known as, for example, so-called projector-based AR, projective AR or spatial AR, such as referred to in reference [1]. The digital information can be any type of visually perceivable data such as objects, texts, drawings, videos, or their combination. The direct augmentation of the real environment could be realized by projecting the computer-generated digital information onto a surface of a real object of the real environment or a part of the real environment using a projector.

Projective AR has many applications, such as prototyping for architecture design, e.g. described in reference [2], and car manufacture, e.g. described in reference [3], ubiquitous computing for novel computer user interface development, e.g. described in reference [4], information displaying, e.g. described in reference [5], or shoe design, e.g. described in reference [6].

In order to have a desired alignment between projected visual digital information and real objects that will be augmented in the real environment, spatial transformations between the real objects and a projector that projects the digital information have to be known. For this, a calibration procedure is often performed to estimate the spatial transformation based on 2D-2D, 2D-3D, or 3D-3D correspondences which is a challenging step for building up projective AR systems. A camera is generally required for such calibration procedure.

Many calibration methods have been proposed and developed to compute a spatial transformation between a projector and a real object. For example, Jundt et al. in reference [3] describe a method to display visual data about a car on a car's surface using a camera and a projector. The camera and the projector should be rigidly coupled in order to calibrate them once and then assume a projector-car extrinsic (i.e. relative spatial position and orientation) computed from processing visual data acquired by the camera. The camera detects visual markers attached to the car in order to estimate a spatial transformation between the camera and the car. In this way, a spatial transformation between the projector and the car could be determined. A problem of the approach is that the position and orientation of the markers relative to the car's coordinate system has to be measured beforehand.

Extend3D, described in reference [6], is a commercial projective AR system which tracks a set of markers based on camera sensors that are rigidly attached to a projector. These two developed systems have several limitations. The calibration cannot be checked by an independent entity. An additional calibration procedure between the cameras and the projectors has to be performed frequently. This procedure cannot be conducted on arbitrary objects, but needs to assume a flat surface, or similar. Furthermore, the visual markers themselves need to be registered with the car, beforehand, which introduces additional error sources.

Raskar et al. in reference [2] developed a projective AR system for supporting architectural design. They propose a calibration method for multiple projectors to ensure that projected images are geometrically aligned. Their system requires manually adjusting projected image texture coordinates to visually align with the physical model (real object).

Kurz et al. in reference [6] present a calibration method to build a spatial transformation between a projector and an indoor physical scene (i.e. real object) based on using a laser-pointer rigidly coupled with a camera. The camera and laser system is mounted in a robotic pan-tilt apparatus such that the movement of the camera and laser could be controlled for scanning the indoor environment and calibrating the projector with the indoor environment. However, the robotic pan-tilt apparatus is expensive and the controlled movement of the camera and laser system is difficult to realize. This is mainly because that the system requires a very precise hand-eye calibration of the pan-tilt-camera that provides the camera position and orientation with respect to the pan-tilt unit. Also sampling the environment with the laser takes a lot of time, as only one point at a time can be sensed.

Fuchs et al. in reference [7] describe the use of structured light from projectors for gathering depth information to be used later in visualization. They do not project virtual information on real objects, but rather use a head mounted display.

Lim in reference [8] employs multiple projectors and one camera for scene reconstruction. They calibrate spatial relationships between multiple projectors based on known transformations between the camera and each of the projectors. During the calibration, they require a projection on a board, which means that they cannot calibrate by projecting on any object of interest. They would need an extra-calibration to be able to estimate the calibration data and transformations in the coordinate system of the object of interest. The goal of reference [8] is to reconstruct the environment. It does not propose any calibration method to compute a spatial transformation between a projector and a real object.

In order to calibrate the spatial relationship between a projector and a real object and estimate the intrinsic parameter of the projector in projective AR applications or systems, all of the previous methods require a complex procedure and/or an expensive hardware setup. This definitely reduces the usability and efficiency of the projective AR application or systems.

Therefore, it would be beneficial to develop a method and system that enable a projective AR system to accurately project digital information on top of real objects without an expensive hardware setup and without the need of conducting lengthy calibration procedures.

SUMMARY

According to an aspect, there is provided a method of projecting digital information on a real object in a real environment, comprising projecting digital information on a real object or part of a real object with a visible light projector, capturing at least one image of the real object with the projected digital information using a camera, providing a depth sensor registered with the camera, the depth sensor capturing depth data of the real object or part of the real object, and calculating a spatial transformation between the visible light projector and the real object based on the at least one image and the depth data.

According to another aspect, there is provided a system for projecting digital information on a real object in a real environment, comprising a visible light projector adapted for projecting digital information on a real object or part of a real object in a real environment, a camera adapted for capturing at least one image of the real object with the projected digital information, a depth sensor registered with the camera and adapted for capturing depth data of the real object or part of the real object, and a processing unit arranged for calculating a spatial transformation between the visible light projector and the real object based on the at least one image and the depth data.

According to a particular implementation, in a preferred embodiment the method comprises estimating a spatial transformation between a RGB-D camera system and the real object based on a known 3D model of the real object and computing intrinsic parameters of the projector and a spatial transformation between the projector and the real object based on projecting one or more visual patterns on the surface or surfaces of the real object or a part of the real object using the projector, and capturing a depth map of the projected visual patterns using the RGB-D camera system.

According to an embodiment, the method further comprises estimating a depth of the digital information using the depth data.

Particularly, the method may further comprise estimating a 3D position of the digital information using the depth data and the at least one image.

In a preferred implementation, the depth sensor and the camera are combined to form a subsystem in which the depth sensor and the camera are interrelated (i.e. have a known transformation between them), the method further including the step of calculating a spatial transformation between the subsystem of depth sensor and camera and the real object.

For example, calculating a spatial transformation between the subsystem of depth sensor and camera and the real object is based on a 3D geometry model of the real object or a part of the real object and a 3D description of the real object or a part of the real object from one or more images and depth data of the real object captured by the subsystem of depth sensor and camera.

Particularly, the method may further comprise estimating a depth of the digital information using a 3D geometry model of the real object or a part of the real object and the calculated spatial transformation between the subsystem of depth sensor and camera and the real object to gain second depth data.

According to an embodiment, the method further includes the steps of projecting as the digital information at least one visual pattern onto a surface of the real object using the visible light projector, and capturing depth data of the projected visual pattern using the depth sensor and camera.

According to an embodiment, the method further comprises the steps of calculating a spatial transformation between the visible light projector and the subsystem of depth sensor and camera, calculating or providing intrinsic parameters of the visible light projector, and computing the spatial transformation between the visible light projector and the real object based on the spatial transformation between the visible light projector and the subsystem of depth sensor and camera, the spatial transformation between the subsystem of depth sensor and camera and the real object, and preferably the intrinsic parameters of the visible light projector.

According to another embodiment, the method further comprises the steps of transforming the depth data of the projected visual pattern from a coordinate system of the subsystem of depth sensor and camera to an object coordinate system of the real object based on the spatial transformation between the subsystem of depth sensor and camera and the real object, calculating or providing intrinsic parameters of the visible light projector, and computing the spatial transformation between the visible light projector and the real object based on the transformed depth data, and preferably the intrinsic parameters of the visible light projector.

For example, the subsystem of depth sensor and camera is a RGB-D camera system with the camera being a RGB (RGB=Red/Green/Blue) camera (with D standing for depth sensor).

Particularly, the depth sensor is capturing depth data of the real object or part of the real object without relying on the visible light projector.

According to an embodiment, third depth data is created using a spatial transformation between the subsystem of depth sensor and camera and the visual light projector and intrinsic parameters of the visual light projector, and projecting an item of digital information on the real object, which is extracted from the image of the camera.

For example, the depth data captured by the depth sensor are called herein in the following as first depth data, and the method further comprises the step of computing a difference between any combination of the first depth data, the second depth data and the third depth data.

According to an embodiment, if a certain distance of the visible light projector to the real object is determined to be reached or exceeded, informing the user about the need to calibrate, or automatically starting a calibration procedure.

According to another embodiment, a distance of the visible light projector to the real object is displayed as a visual information on the real object using the visual light projector.

According to an embodiment, the method comprises the step of tracking the real object using the subsystem of depth sensor and camera.

For example, one or more visual markers are added into the real environment to support the tracking.

In a preferred embodiment, an Iterative Closest Point (known as ICP) algorithm, as referred to in more detail below, is used to initialize a pose of the depth sensor.

According to an embodiment, pose data of the visible light projector are used to set specific parameters of the projector, such as focus or zoom or brightness.

Particularly, a brightness of the visible light projector may get smaller if the projector gets closer to the real object.

Particularly, the zoom of the visible light projector increases the projector's field of view when getting closer and decreases the field of view when moving further away.

According to a further embodiment, the method further comprises the step of interaction by the user on top of the surface of the real object using the subsystem of depth sensor and camera in order to recognize touches by the user.

According to another aspect, the invention is also related to a computer program product adapted to be loaded into the internal memory of a digital computer system, comprising software code sections by means of which the steps and features as described above are performed when said product is running on said computer system. Further, the invention can also be partly implemented in hardwired logic and may be related to a programmed logical circuit that is arranged for performing a method as described herein.

According to an embodiment of the system according to the invention, the camera and the depth sensor are integrated into a common housing.

Preferably, the camera and the depth sensor are functional units of a RGB-D camera.

In a particular implementation, the visible light projector, the camera and the depth sensor are part of a hand-held or head-mounted device.

In a preferred implementation, the camera includes a visible light camera, preferably an RGB camera, and the depth sensor includes an infrared light projector and an infrared light camera.

According to an embodiment, the visible light projector, the camera and the depth sensor are integrated into a common housing, wherein the visible light projector is separated from the camera and the depth sensor by insulating or heat-damping material.

According to another embodiment, the visible light projector, the camera and the depth sensor are integrated into a common housing, wherein a base plate of the housing is made of a carbon fiber laminate.

According to a further embodiment, the system includes calibration means, which inform the user about a need for a new calibration of the system in case a temperature difference between a temperature of a recent calibration and a current temperature exceeds a threshold, or which automatically conducts a self-calibration of the system.

For example, the visible light projector contains at least one of the following elements: a vent, zoom optics, variable focus lenses.

According to an embodiment, the system further includes an infrared light projector, preferably used as part of the depth sensor, wherein the infrared light projector does not contain at least one of the following elements: a vent, zoom optics, variable focus lenses.

BRIEF DESCRIPTION OF THE DRAWINGS

Aspects of the invention and embodiments thereof will now be described with reference to the drawings, in which:

FIG. 2 shows another exemplary system setup according to an aspect of the invention where a RGB-D camera system and a visible light projector are rigidly coupled with each other.

DETAILED DESCRIPTION

Figure 1A:
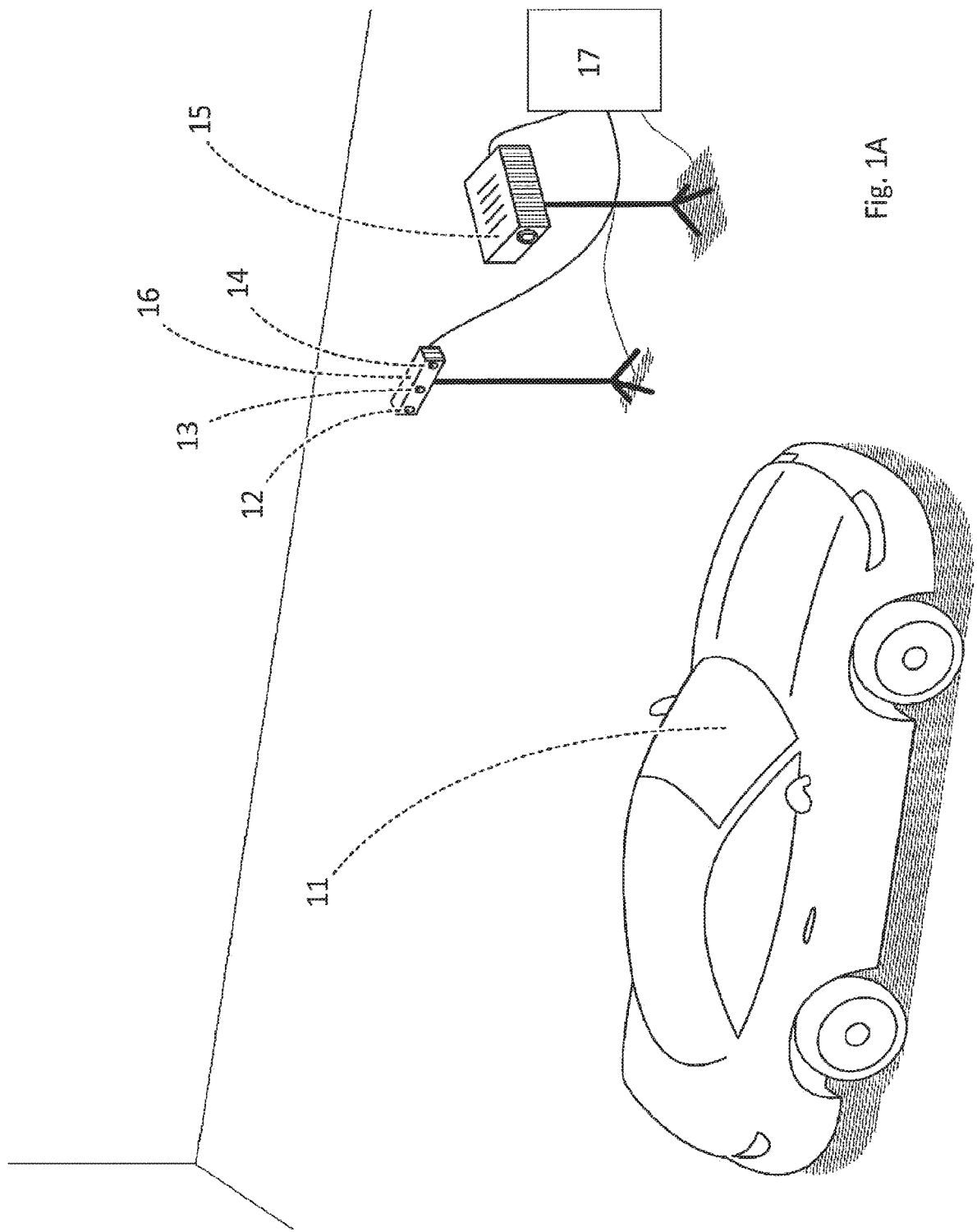
FIG. 1A shows an exemplary system setup according to an aspect of the invention, wherein in a RGB-D camera system and a visible light projector are not rigidly coupled with each other.

In the following description of embodiments and aspects of the invention, it is mainly referred to the system setup according to FIGS. 1A and 1B, which are only meant as exemplary system setups for explaining the invention without limiting the invention to any particular aspects shown therein. Generally, a system setup according to the invention is capable of projecting digital information on a real object in a real environment. In the present example, the real object is a car 11, however any other real object or parts thereof may also be used. The system includes a visible light projector 15 adapted for projecting digital information on a real object, such as the car 11, or part of a real object in a real environment, a camera 12 (particularly a visible light camera, such as a RGB camera or other types as set out herein below) adapted for capturing at least one image of the real object 11 with projected digital information, and a depth sensor (comprising, in the present example, an infrared light camera 13 and an infrared light projector 14) which is registered with the camera 12 and adapted for capturing depth data of the real object 11 or part of the real object 11. Using an infrared projector and infrared camera as depth sensor is a technique for measuring depth data of a real object, on which the infrared light is projected and captured by the infrared camera, which is known to the skilled person. Other depth sensing techniques may also be used.

The visible light camera 12 and the depth sensor 13, 14 form a subsystem 16 of camera 12 and depth sensor 13, 14 in which camera and depth sensor are interrelated, i.e. are interrelated by a known spatial transformation between them. For example, the subsystem 16 is an RGB-D camera system, as described in more detail below. The system further includes a processing unit arranged, inter alia, for calculating a spatial transformation between the visible light projector 15 and the real object 11 based on the at least one image captured by the camera 12 and the depth data measured by the depth sensor 13, 14, and for calculating any other transformations needed therefor and calculations as set out herein in more detail below. The processing unit 17 may be any suitable processing unit as typically used in compact or distributed computer systems for such applications, such as a CPU of a personal computer or any other suitable processor or processing unit or logic.

According to a preferred embodiment of the present invention, computer-generated digital (also called herein virtual) information is projected on surfaces of a real object, in the present case of real object 11, in a real environment using visible light projector 15 by estimating a spatial transformation between RGB-D camera system 16 and the real object 11 based on a known 3D model of the real object and computing the intrinsic parameters of the projector 15, and a spatial transformation between the projector 15 and the real object 11 based on digital information (preferably one or more visual patterns) projected from the projector 15 onto the real object 11 or part of the real object 11 and a depth map of the projected digital information (e.g., visual patterns) captured by the RGB-D camera system 16.

According to aspects of the invention, there is proposed a method of projecting digital information on a real object in a real environment and calculating, particularly in a calibration procedure, a spatial transformation between a visible light projector projecting the digital information on the real object or part of the real object and the real object or part of the real object. A spatial relationship or spatial transformation specifies how an object is located in 3D space in relation to another object in terms of translation and rotation. An RGB-D camera system is a capturing device that is capable of capturing an RGB-D image of a real environment or a part of a real environment. An RGB-D image is an RGB image with a corresponding depth map (i.e. depth data related to real objects captured in the image). Instead of a depth-image, the system could also provide a 3D model relative to the camera coordinate system. The proposed invention can be easily generalized to any camera providing an image format (color or gray scale) that additionally provides depth data. It is not restricted to capture systems providing color images in the RGB format. It can also be applied to any other color format and also to monochrome images, for example to cameras providing images in grayscale format. In an advantageous implementation the visible-light camera could be a high dynamic range camera or a camera equipped with a filter restricting its responsiveness to certain light waves, e.g. making the camera only see blue colors. The depth images do not need to be provided in the same resolution as the visual (color/grayscale) camera image. The so-called RGB-D system can be any combination of devices that are mounted and calibrated together to provide a set of photometric information and depth information of a set of physical points in the environment.

The real environment consists of one or more real objects. A real object could be any physically existent object in the world, such as a car, a tree, a building, a human, or a stone.

A projector is an optical device that projects an image (i.e. visual digital information) onto a physical surface of a real object or a part of a real object. Visual digital (or virtual) information can be any type of visually perceivable data such as objects, particularly 3D objects, texts, drawings, videos, user-interface elements (e.g. buttons) or their combination.

A 3D model of a real object describes the 3D geometry of the real object. Geometry describes one or more attributes including, but not limited to, shape, symmetry, geometrical size, and structure.

A problem of calibrating a spatial relationship between a projector and a real object is to determine a transformation including translation and orientation between the projector and the real object.

Figure 1B:
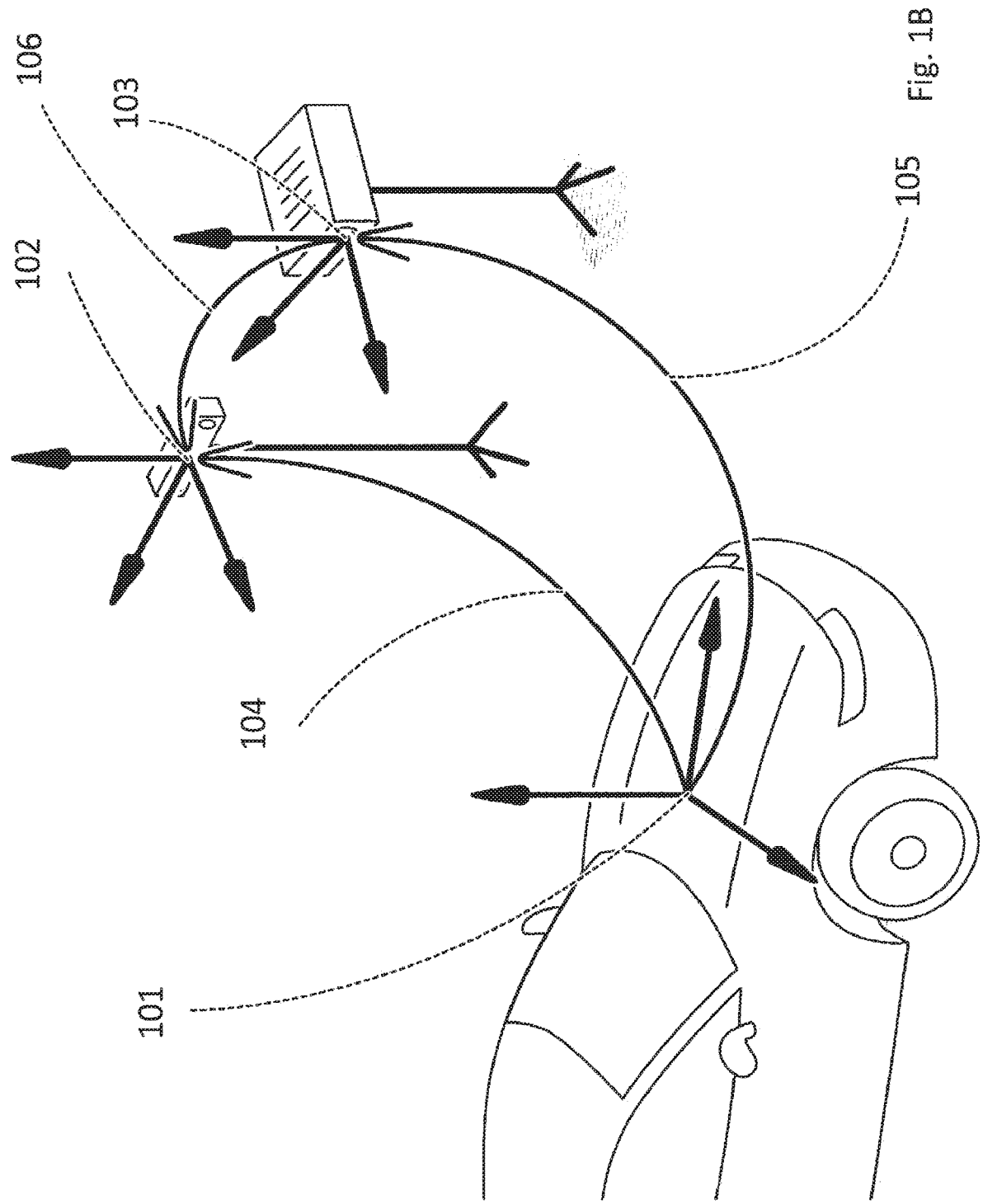
FIG. 1B shows the system setup according to FIG. 1A with an additional visualization of coordinate systems used according to aspects of the invention.

In the following, given the exemplary background scenario as shown in FIGS. 1A and 1B, it is referred to FIG. 3 which shows an embodiment of a method according to the invention as a flowchart.

Figure 3:
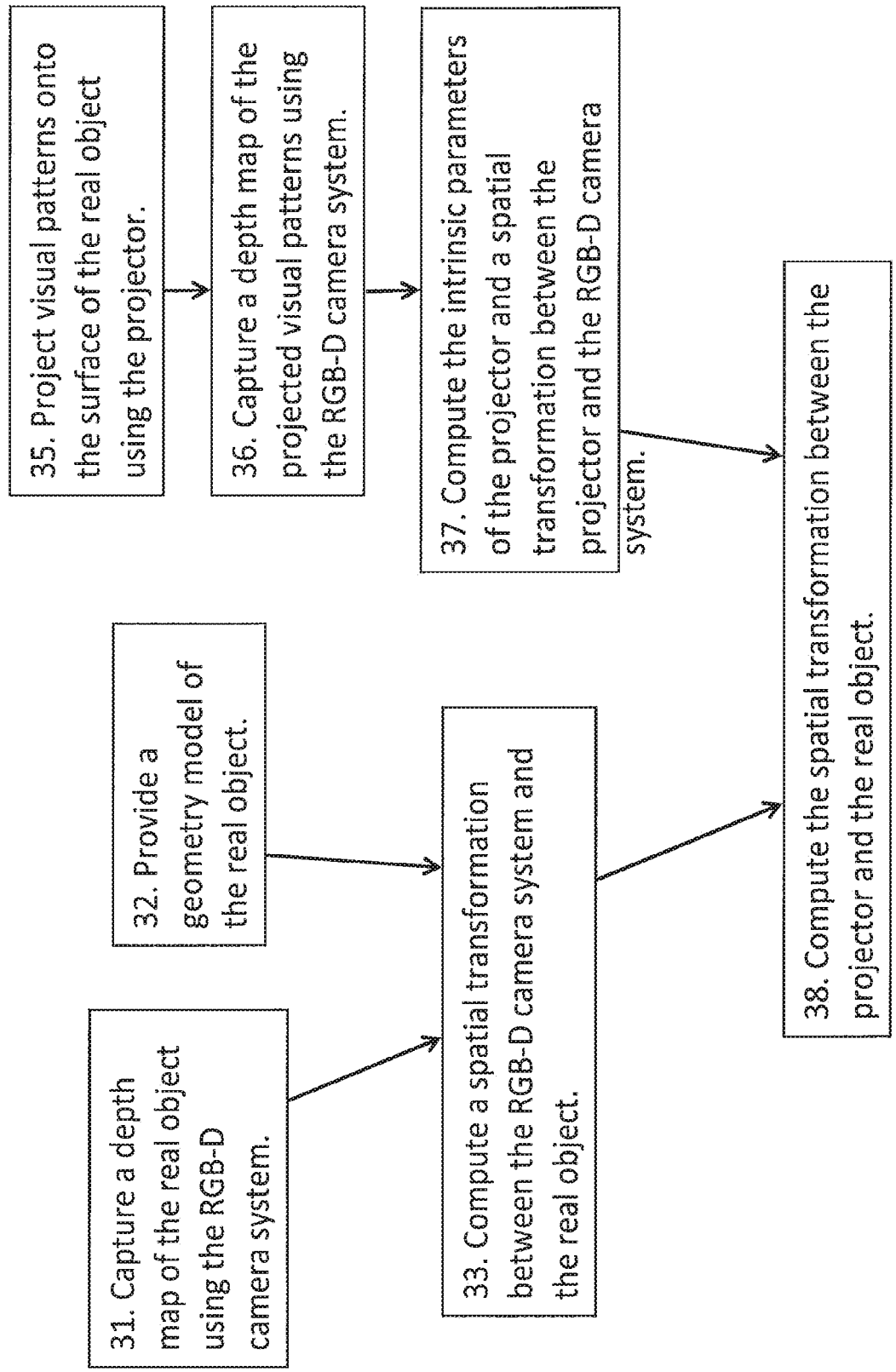
FIG. 3 shows a flowchart diagram of a method according to an embodiment of the invention.

A 3D description (for example in a form of a point cloud located on the surface) of the real object 11 or a part of the real object 11 is constructed based on a depth map of the real object or a part of the real object from depth data captured by the RGB-D camera system 16 (Step 31 in FIG. 3). The 3D description of the real object 11 is constructed in the RGB-D camera coordinate system 102 (FIG. 1B). A spatial transformation 104 between the RGB-D camera system 16 and the real object 11 can be estimated numerically by finding the best geometric match between the reconstructed point cloud expressed in the RGB-D camera coordinate system 102 and a point cloud of the known 3D model of the real object 11 (provided in step 32) expressed in the real object coordinate system 101. This can be achieved by using an iterative closest point (ICP) algorithm, which is per se known to the skilled person, and as described in more detail below. Other methods could be based on matching specific features of both models, based on topology, curvature or shape, as described in reference [16]. The point cloud of the known 3D model of the real object could be obtained by sampling the 3D model via ray-casting, for example. It is also possible to sample the 3D model by triangles and then employ the ICP algorithm based on point-to-plane distance to estimate the spatial transformation between the RGB-D camera system and the real object (Step 33 in FIG. 3). To the person skilled in the art it is clear, the known 3D model of the real object could also be provided in form of a mathematical description, e.g. SPLINES or NURBS.

The projector 15 projects a visual pattern or patterns with known geometry onto the surface of the real object 11 or a part of the real object 11 (Step 35 in FIG. 3). The visual pattern could be of various forms, such as points, lines, multiple points, multiple lines, grids, circles, cross-hairs, thick stripes, binary-coded patterns, gray code patterns, color-coded stripes, and random textures. The 3D position(s) of the projected visual pattern(s) in the RGB-D camera coordinate system 102 could be directly obtained from a depth map captured by the RGB-D camera system (Step 36 in FIG. 3). In an alternative implementation, the 3D positions of the projected visual pattern(s) can be retrieved from the 3D model of the real object, after the spatial transformation 104 between the RGB-D camera system and the real object has been estimated.

A spatial transformation 106 between the projector 15 and the RGB-D camera system 16 as well as intrinsic parameters of the projector 15 could be computed based on the 2D coordinates of the visual pattern(s) in the projector coordinate system 103 and corresponding 3D coordinates of the visual pattern(s) in the RGB-D camera coordinate system 102 (Step 37 in FIG. 3). In case the intrinsic parameters of the projector are known, they could be used instead of being re-estimated. The intrinsic parameters are typically used to calculate the spatial transformation between visible light projector and the subsystem of depth sensor and camera. Once spatial transformations have been determined, the intrinsic parameters may only be used in the step of visualization of information on the real object.

It should be noted that the described procedures of computing the spatial transformation 104 between the real object and the RGB-D camera system and computing the spatial transformation 106 between the projector and the RGB-D camera system could be performed in parallel in case the 3D positions of the projected visual patterns are obtained from the depth map.

Finally, the spatial transformation 105 between the projector 15 and the real object 11 is computed based on the estimated spatial transformation 104 between the real object 11 and the RGB-D camera system 16 and the estimated spatial transformation 106 between the projector 15 and the RGB-D camera system 16 (Step 38 in FIG. 3).

Furthermore, the present invention does not require the projector 15 and the RGB-D camera system 16 to be rigidly coupled or to have a pre-known spatial transformation between the projector 15 and the RGB-D camera system 16 (see FIG. 1A). This increases the usability and flexibility of the present invention compared to the prior art, as described in references [3, 6]. Especially because RGB-D systems are available as compact systems without movable parts or optics, which are easy to calibrate and their physical structure will not change easily, and therefore calibration will normally not change. On the other side, projectors are often equipped with movable optics and show large changes in temperature. They also often have large housings, damped optics and vents. All these characteristics make them strong at displaying very bright and high-quality images, but make them very hard to calibrate sustainably.

Figure 4:
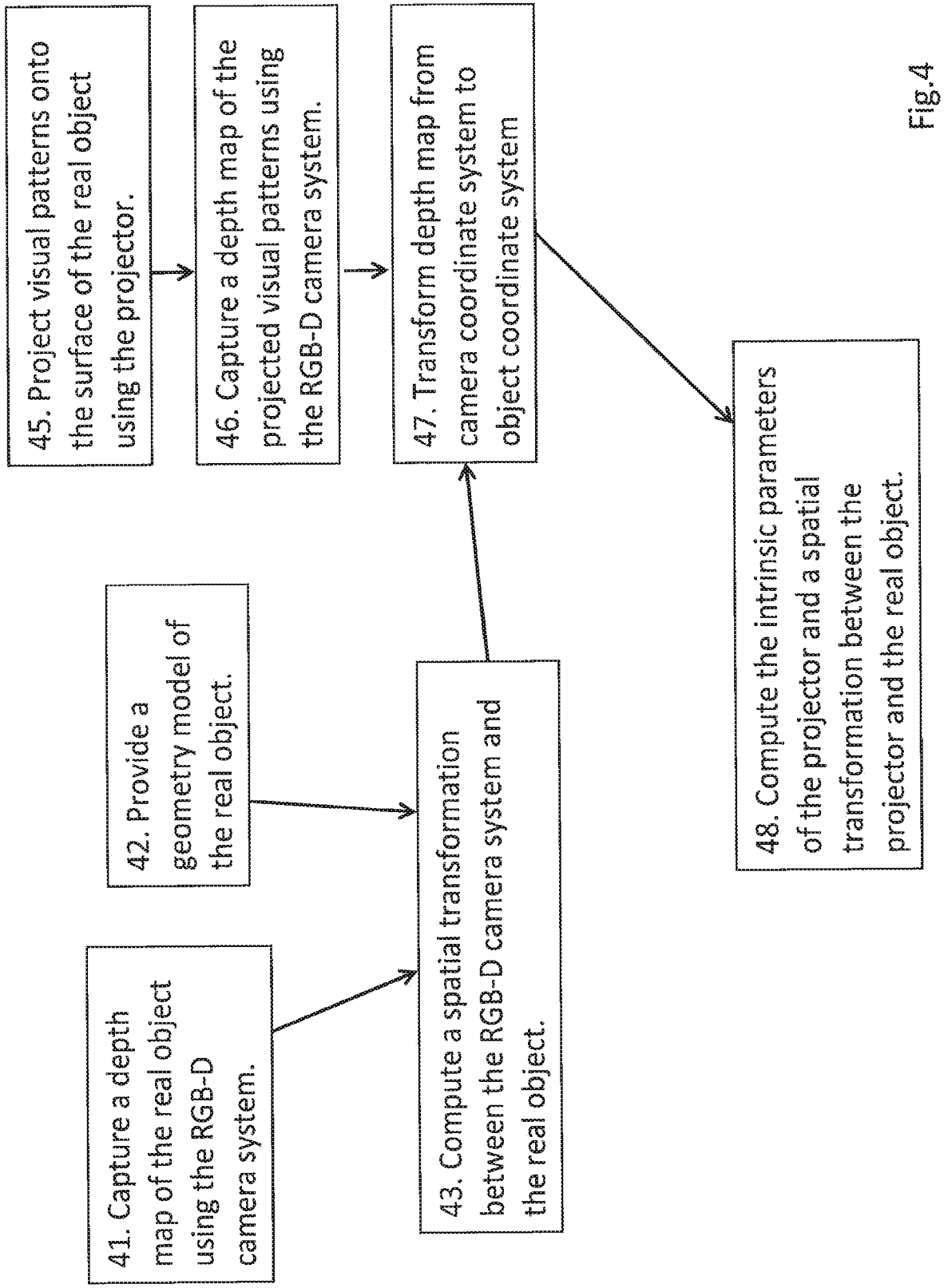
FIG. 4 shows a flowchart diagram of a method according to another embodiment of the invention.

Another embodiment of a method according to the invention is illustrated in FIG. 4. Steps 41-46 are corresponding to steps 31-36 as described above with reference to the embodiment of FIG. 3. As described above, the registration between the RGB-D camera system 16 and the real object 11 is determined, and projecting visible pattern(s) onto the real object 11 leads to 2D-3D correspondences between the projector coordinate system 103 and the RGB-D camera coordinate system 102.

In step 47, the 3D coordinates of these correspondences are transformed from the RGB-D camera coordinate system 102 to the object coordinate system 101 using the transformation determined using the ICP algorithm. Finally, the spatial transformation between the projector 15 and the real object 11 (and optionally the intrinsic parameters of the projector) is computed based on 2D-3D correspondences between the projector 15 and the object coordinate system 101 in step 48.

Possible Implementations of an RGB-D Camera System:

The RGB-D camera system could be a time of flight (TOF) camera system. Kolb et al. in reference [9] give an overview on state of the art on time-of-flight camera sensors and applications. An RGB-D camera system 16 could also be built using an RGB camera 12, an infrared light camera 13 and an infrared projector 14 (see FIG. 1A). The RGB camera 12, the infrared light camera 13 and the infrared light projector 14 are typically rigidly coupled and their spatial relationships are known. By this, the RGB camera, the infrared light camera and the infrared light projector could be defined in a common coordinate system named as the RGB-D camera coordinate system 102. Advantageously, the three sensors are all tightly attached to one common part, e.g. a solid block of metal or a carbon fiber laminate part.

Several methods, such as described in references [2,6], have been developed to calibrate a spatial relationship between a camera and a projector. A common way is to let the projector project a pattern with known geometry onto a physical surface and the camera capture the projected pattern. This could build correspondences between the projector coordinate system and the camera coordinate system, and thus the transformation between the projector and the camera could be estimated.

An infrared light projector and an infrared light camera together could produce a depth map of a real object or a part of the real object. For this, the infrared projector projects a pattern with known geometry onto the real object, and the infrared camera captures an image of the projected pattern. From the image of the projected pattern, a depth map of the real object could be generated. As the RGB camera, the infrared camera and the infrared projector were calibrated in the common RGB-D camera coordinate system, a RGB-D image could be obtained from a depth map and a RGB image of the RGB camera.

There are some commercially available RGB-D camera systems based on using an RGB camera, an infrared camera and an infrared projector, such as the known Kinect system from Microsoft or Xtion Pro from Asus. These systems are examples of off-the-shelf commodity cheap consumer devices. U.S. Pat. No. 8,150,142 B2 and U.S. Pat. No. 7,433,024 B2 describe detailed ways of a possible implementation of an RGB-D sensor.

An advantageous version of a depth sensor in this invention is capable of delivering a depth image at interactive frame rates (e.g. higher than 5 frames per second).

Figure 8:
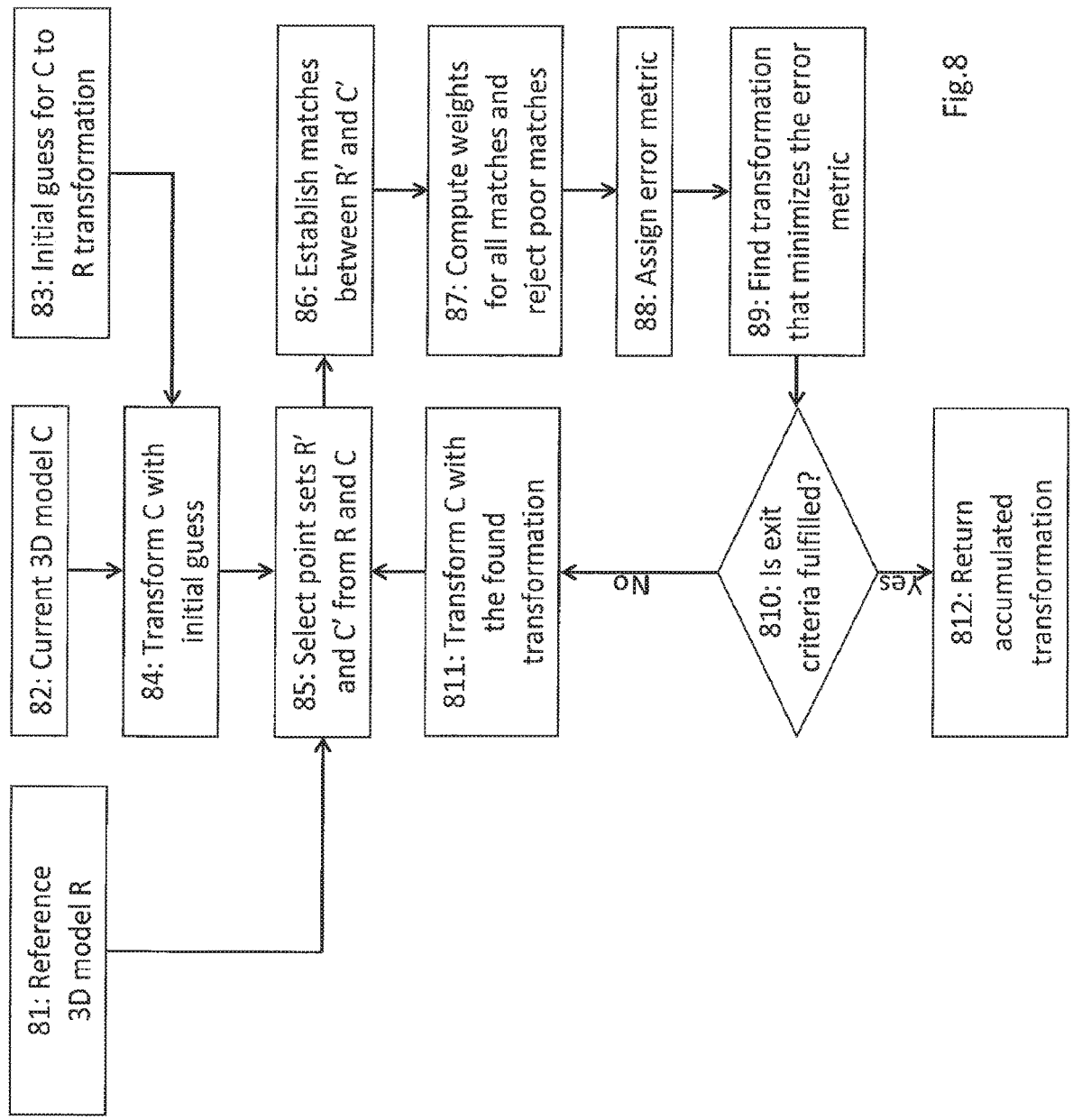
FIG. 8 shows a flowchart diagram of an exemplary ICP algorithm which may be used in connection with a method according to aspects of the invention.

Possible ICP Algorithm Implementation:

Iterative Closest Point (ICP) (described in, e.g., reference [12]) is an algorithm to spatially register two partially overlapping 3D models, which are often represented by 3D point clouds. The aim of the algorithm is to find a 6 DoF (DoF: Degrees of Freedom) rigid body transformation (comprising a 3D rotation and a 3D translation) that transforms one model to be registered with the other, see e.g. FIG. 8 which is described in the following:

Given a reference model R (step 81), a current model C (step 82), and an initial guess of the transformation between C and R (step 83), the method initially transforms C (step 84) with the provided initial guess. Note that in the simplest case, the initial guess can be an identity transform. The iterative method now selects point samples R' and C' from the models R and C (step 85) and then establishes matches between these two sets of points (step 86). In the simplest case, a matching correspondence for a point in C' is determined as the closest point in R'. In a subsequent step (step 87) weights are computed for every match. Note that the simplest implementation of this is to assign equal weights to all matches. After assigning an error metric (step 88), e.g. the root-mean-square of the distance between the matching points, a transformation is found that minimizes this error metric (step 89).

An exit criteria (step 810) decides, if the found solution should be refined in an additional iteration or not. If so, C is transformed with the found transformation (step 811) before the next iteration starts by selecting point samples R' and C' from the models R and C (step 85). Otherwise, the accumulated transformation, i.e. the accumulation of all transformations that were applied to C during the iterative approach and the last transformation found in step 89 is returned as final transformation aligning C with R (step 812).

Potential Additional Uses of the Depth Sensor:

Having a depth-sensor capable of generating depth images has additional advantages. One advantage can be the implementation of a difference measurement in order to find discrepancies between the virtual model (e.g. a computer aided design (CAD) model) of the real object and the actual geometry of the real object. Because the ICP algorithm is capable of handling partial errors or differences between two 3D models, the algorithm will in most cases be able to align a partially different virtual model to depth data coming from the depth sensor. The difference can then be calculated, e.g. between a vertex or point of one model to the closest vertex or point of the other model. Assigning different distances different colors the projector could color parts of the real object according to their difference to the virtual 3D model.

Another advantage can be the additional implementation of a touch-interaction with the real object. From the state of the art (e.g. reference [11]), techniques are known to retrieve body gestures from depth data. Body tracking could be used to retrieve a rough head-position of a user of the system. This head position can be used to refine the displayed virtual data to look more realistic and be better aligned to the real object, than just assuming the user to have the visible projector's viewpoint. More on this rendering technique can be found in reference [13].

Body tracking could also be used to retrieve a user's hand position or to retrieve the nearest body part of the user that is close to the real object. The system could interpret any body part or only a hand, which is assumed to be closer than a certain threshold (e.g. 10 cm) from the real object, to be a mouse-click or a mouse-event, where the considered mouse-position corresponds to the nearest 3D point on the 3D model, projected into 2D coordinates according to the projector intrinsic parameters. Using this information and combining it, or by directly identifying the subpart of a 3D model with known techniques, all kinds of user-interactions could be triggered. For example a virtual post-it could be attached to the 3D model at this position or a part could be animated or highlighted. Even design-tasks could be conducted, by dragging virtual objects on top of the real object or "virtually painting" on top of the real object.

An advantageous addition to the touch-interaction aspect is to detect the user's touching the real object by using capacitive sensing or by measuring a current when the user touches the real object. A capacitive sensing circuit could be connected to the real object and provide an input signal to the processing unit when it detects a change in capacity of the real world object. Insulating the real object from the ground and connecting the real object to a voltage (e.g., by a high resistance) and measuring the current that incurs when a user touches the object, connecting it to the ground, could be an alternative implementation. The depth sensor data can then be evaluated in order to assume the position of where the real object might have been touched.

Wikipedia, retrieved Dec. 17.sup.th 2012, provides the following possible ways of implementing a capacitive sensing circuit (http://en.wikipedia.org/wiki/Capacitive_sensing):

"Capacitance is typically measured indirectly, by using it to control the frequency of an oscillator, or to vary the level of coupling (or attenuation) of an AC signal. The design of a simple capacitance meter is often based on a relaxation oscillator. The capacitance to be sensed forms a portion of the oscillator's RC circuit or LC circuit. Basically the technique works by charging the unknown capacitance with a known current. (The equation of state for a capacitor is i=C dv/dt. This means that the capacitance equals the current divided by the rate of change of voltage across the capacitor.) The capacitance can be calculated by measuring the charging time required to reach the threshold voltage (of the relaxation oscillator), or equivalently, by measuring the oscillator's frequency. Both of these are proportional to the RC (or LC) time constant of the oscillator circuit. The primary source of error in capacitance measurements is stray capacitance, which if not guarded against, may fluctuate between roughly 10 pF and 10 nF. The stray capacitance can be held relatively constant by shielding the (high impedance) capacitance signal and then connecting the shield to (a low impedance) ground reference. Also, to minimize the unwanted effects of stray capacitance, it is good practice to locate the sensing electronics as near the sensor electrodes as possible. Another measurement technique is to apply a fixed-frequency AC-voltage signal across a capacitive divider. This consists of two capacitors in series, one of a known value and the other of an unknown value. An output signal is then taken from across one of the capacitors. The value of the unknown capacitor can be found from the ratio of capacitances, which equals the ratio of the output/input signal amplitudes, as could be measured by an AC voltmeter."

The user's touch could also be used without measuring the user's position and could simply trigger a next step in a possible content workflow. For example the system first displays a virtual engine on a real car and after touching the car the system switches to displaying the structure of the gear-box.

In order to extend the range of the depth sensor or addressing more of the user of the system, a second depth sensor could be mounted in a fixed spatial relationship to the first depth sensor. The two depth sensors could be triggered sequentially or only on demand.

Compared to the methods as described in references [3,6], the present invention does not require a rigid coupling between the visible light projector and the RGB-D camera system, and does not need a visual marker or texture foreground rigidly attached to the real object. Therefore, the present method simplifies the calibration procedure of computing the spatial transformation between the real object and the visible light projector and estimating the intrinsic parameters of the projector. Furthermore, a marker-object calibration between the visual marker and the real object is not required in the present method compared to the methods as described in [3,6], which removes the errors caused by the marker-object calibration.

Compared to the method as described in reference [6], that requires robotic device to move a pointer attached with a camera for scanning the real object, the present invention employs a different idea, preferably based on a RGB-D camera system. The present invention could reduce the calibration time compared to the method as described in [6]. Moreover, as the two described procedures of computing the spatial transformation between the real object and the RGB-D camera system and computing the spatial transformation between the projector and the RGB-D camera system could be performed in parallel, the present invention could further speed up the calibration. Advantageously, the RGB-D camera system is capable of providing depth images of a resolution higher than 50 times 50 pixels at frame rates of above 10 Hz.

A further depth map of the real object or a part of the real object could be produced by projecting and capturing using the visible light projector and the RGB image of the RGB-D camera system. This depth map should be the same as the depth map provided from the RGB-D camera system. Assuming that the RGB-D camera system is fixed with respect to the real object, whenever the projector moves away from the real object or away from the RGB-D camera system after the calibration of the spatial relationship between the projector and the real object, the two depth maps will be different and the system should be re-calibrated.

In the following, it is referred to another embodiment of a system according to FIG. 2. Similar as the system according to FIG. 1, there is provided a RGB-D camera system 26 with an RGB camera 22, a depth sensor formed by infrared light camera 23 and infrared light projector 24, and a visible light projector 25 which projects digital information on a real object 21. Assuming that the relative transformation between the RGB-D camera system 26 and the projector 25 is fixed (see FIG. 2), it is possible to detect a movement of the real object 21 after the calibration of the spatial relationship between the projector 25 and the real object 21. The spatial relationship between the projector 25 and the real object 21 should be re-calibrated as soon as such movement is detected.

The detection could be realized as follows. Let the visible light projector project visual patterns onto the top of the real object and let the RGB-D camera system capture an image of the projected patterns, and then check whether the image positions of the projected patterns are at the desired position or not. The desired image positions can be estimated by computing intersections between the rays of the visual patterns emitted from the projector and the 3D model of the real object based on the calibrated spatial relationship between the real object and the projector. The 3D positions of the intersections could be expressed in the real object coordinate system. The desired image positions are the re-projections of the intersections into the image coordinate system of the RGB-D camera system based on the calibrated spatial relationship between the real object and the RGB-D camera system.

The detection could also be realized based on depth maps obtained from the RGB-D camera system. If a current obtained depth map is different from a depth map captured at the calibration from the RGB-D camera system, there may exist a movement of the real object after the calibration.

Assuming that the relative transformation between the RGB-D camera system 26 and the projector 25 is fixed (see FIG. 2), after the calibration of the spatial relationship between the projector and the real object, the RGB-D camera system could track the movements of the real object using computer vision methods or the ICP, as used during initialization, and the spatial relationship between the projector and the real object could be updated accordingly. Furthermore, the system parameters of the visible light projector could be adjusted according to the pose of the real object with respect to the RGB-D camera system from the tracking. For example, the brightness of the projector gets lower when it is closer to the real object.

Adding visual markers to the real object after the calibration could enable a robust tracking of the real object using the RGB-D camera system.

The present calibrated system of the RGB-D camera system and the projector could further support to detect user's interaction on top of the real object by using the depth map from the RGB-D camera system in order to see touches.

An advantage of the invention is that, after calibration, two independent sources of depth data exist. Therefore, it is possible to evaluate the quality of the projective AR system and its calibration by comparing two sets of depth data regarding the real object, one from the RGB-D camera system and one from using the visible light projector and RGB images of the RGB camera. The depth data provided from using the projector and RGB images of the RGB camera could be realized by letting the projector project visual patterns with known geometry onto physical surfaces of the real object and the RGB camera capture the RGB images of projected patterns. Having intrinsic and extrinsic data available, the two models can be registered and a quality measurement, e.g. the average distance of reconstructed points from the projector to the RGB-D model can be returned.

Another possible way of checking the quality of the calibration is to project detectable visible light information onto the real object. According to the intrinsic parameters of the visible light camera, the intrinsic parameters of the visible light projector and the spatial relationship of visible light projector to the real object and to the visible light camera, the detectable visible light can be expected to have a certain position in the visible light camera image. The intrinsic parameters of the visible light camera are known from a pre-calibration procedure. The distance between the detectable visible light information's expected position and its real position can be returned in pixels as a quality measure. Alternatively, the difference can be mathematically projected onto the real object and converted to millimeters.

According to an aspect of the invention, the visible light camera and the depth sensor are integrated into a common housing, particularly are functional units of a RGB-D camera system as described. The system, including the visible light projector, the depth sensor and the visible light camera could also be implemented in a miniaturized way to form a hand-held or head-mounted device.

Figure 5:
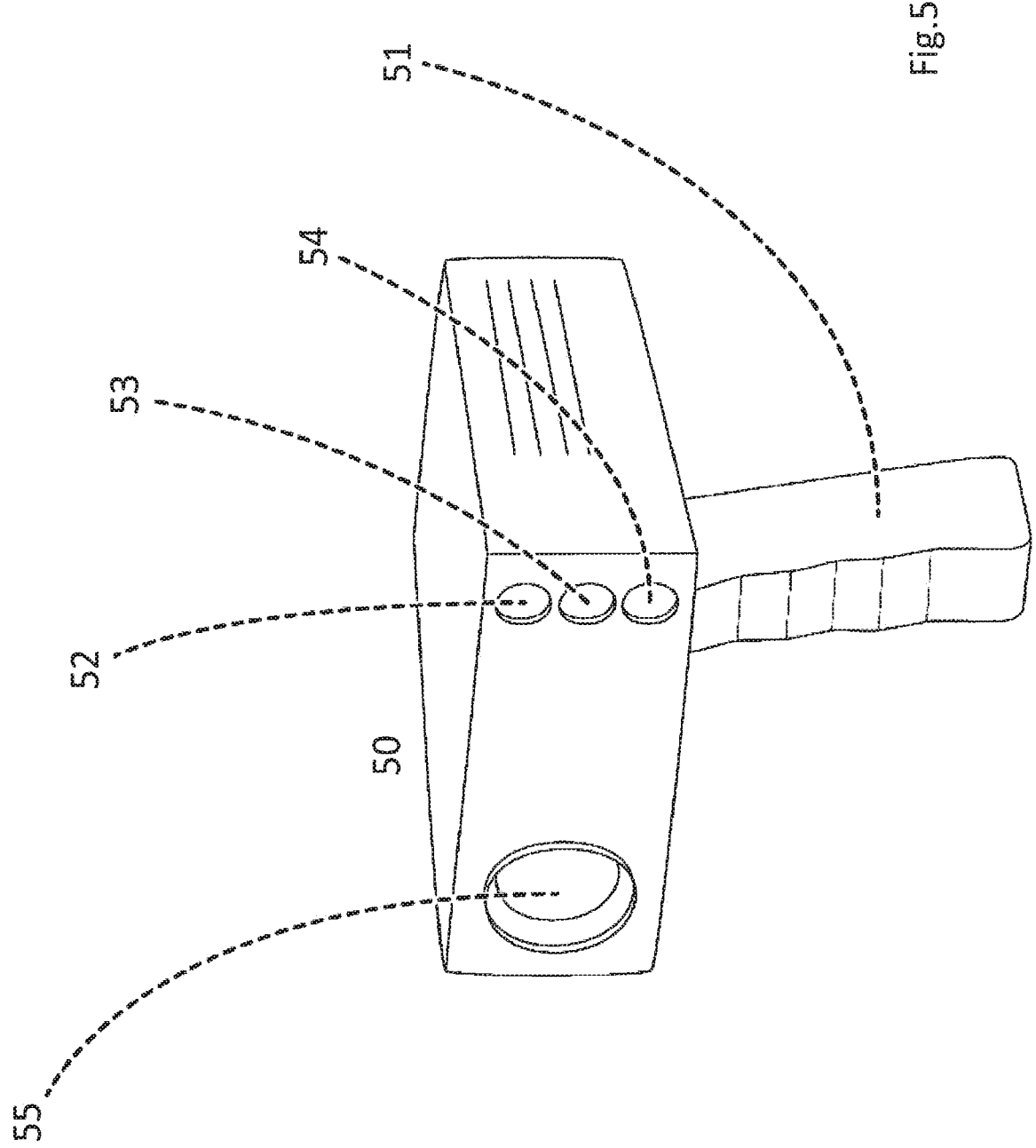
FIG. 5 shows an exemplary hand-held device including a visible light projector and a RGB-D camera system which may be used according to aspects of the invention.
Figure 6:
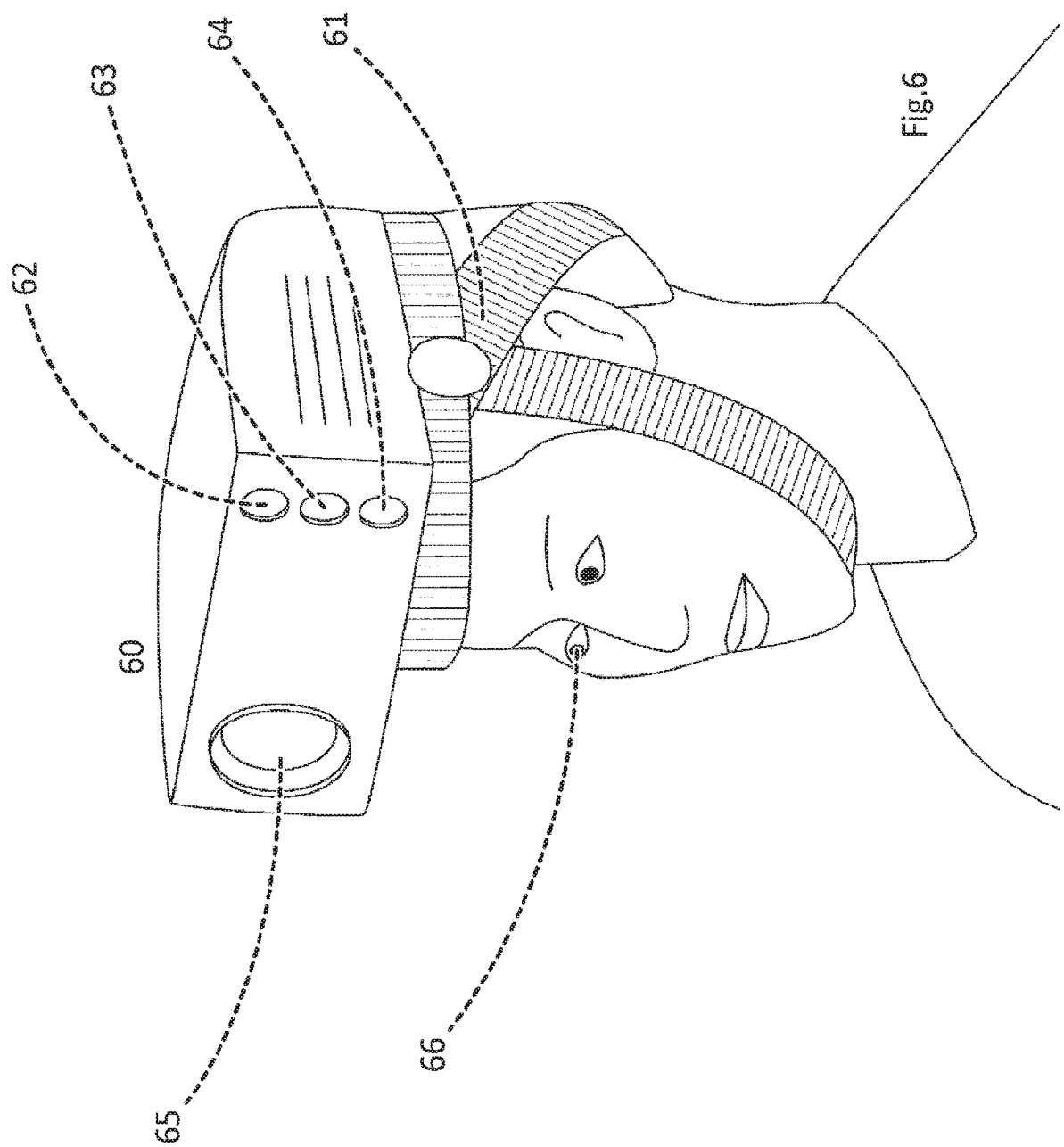
FIG. 6 shows an exemplary head-mounted device including a visible light projector and a RGB-D camera system which may be used according to aspects of the invention.
Figure 7:
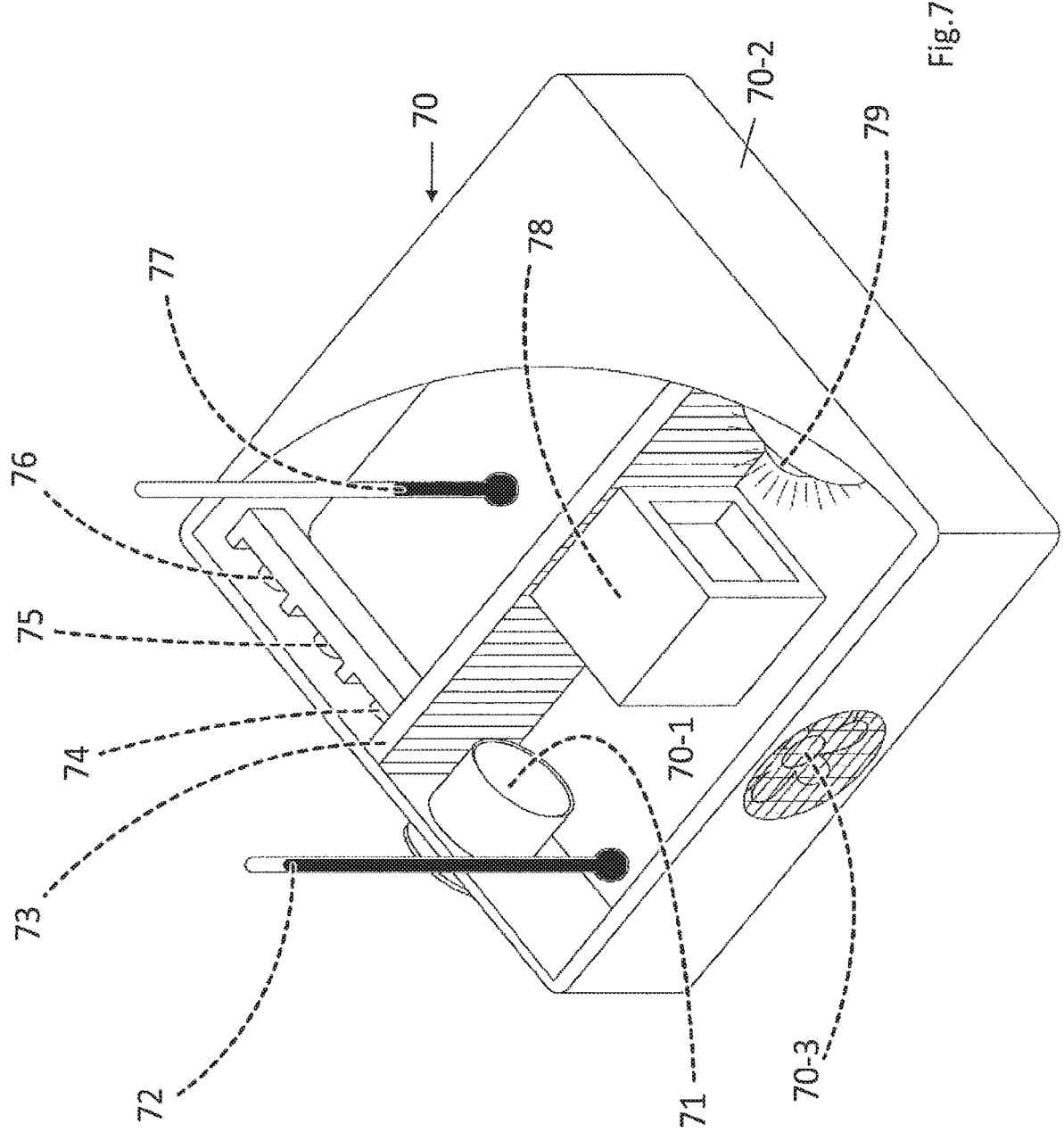
FIG. 7 shows an advantageous hardware-setup according to aspects of the invention.

A potential implementation is respectively shown in FIGS. 5, 6 and 7. The system of a visible light projector and a RGB-D camera system could—if miniaturized—be formed as a hand-held or head-mounted device. An exemplary hand-held device 50 comprising the projector and the RGB-D camera system shown in FIG. 5 may include a handle 51, a visible light projector 55 and a RGB-D camera system. The RGB-D camera system may further include an infrared projector 52, an infrared camera 53, and a RGB camera 54.

An exemplary head-mounted device 60 comprising a visible light projector and a RGB-D camera system shown in FIG. 6 may include a fixation component 61, a visible light projector 65 and a RGB-D camera system. The RGB-D camera system may further include an infrared projector 62, an infrared camera 63, and a RGB camera 64. The fixation component 61 could support a rigid fixation between the head-mounted device and the head of a user who perceives with his eyes 66 the projected digital information.

Another advantageous hardware-setup of a system according to aspects of the invention is shown in FIG. 7. A visual light projector, which is typically hard to calibrate, and a RGB-D camera system are combined in a common housing 70, but are at the same time functionally separated. The elements of the RGB-D camera system, which in this embodiment comprises an infrared light projector 74, a visible light camera 75 and an infrared light camera 76, are attached to a solid construction element, therefore their spatial relationship should be robust against movement or even impacts during transport. At least one of the visible light camera 75, the infrared light projector 74 and the infrared light camera 76 can, in one possible implementation, be equipped with fixed focus optics. The hard-to-calibrate visible light projector comprises complex optics 71, which may include dampers, zoom and focus mechanics. It has a high-energy light source 79 and a spatial light modulator 78. Because of the high-energy light source, the visible light projector has large changes in temperature after it is turned on (indicated by the optional temperature indicator or sensor 72). Large changes in temperature are a major source of decalibration, because the change in size of construction element may change the spatial relationship of system components.

Therefore, the visible light projector and the RGB-D camera system are in this embodiment separated by insulating or heat-damping material 73. Advantageously, the base plate 70-1 of the housing is made of carbon fiber laminate and the RGB-D camera system and the visible light-projector are tightly attached to the base-plate 70-1 and not attached to the side wall 70-2 of the housing. The housing side wall 70-2 could be attached so that it can slightly move against the base plate 70-1. Advantageously, the housing can have at least one fresh-air supply or hot-air outlet 70-3. Advantageously, the system could have at least one temperature sensor 72. The system could inform the user about the need for a new calibration in case the temperature difference between the last calibration and the current temperature exceeds a given threshold. Alternatively, the system could automatically conduct a self-calibration.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

REFERENCES

10. Sanni Siltanen, Theory and applications of marker-based augmented reality. Espoo 2012. VTT Science 3. http://www.vtt.fi/inf/pdf/science/2012/S3.pdf [0114] 11. Raskar, Ramesh, Greg Welch, and Wei-Chao Chen. "Tabletop spatially-augmented realty: bringing physical models to life with projected imagery." Augmented Reality, 1999. (IWAR '99) Proceedings. 2nd IEEE and ACM International Workshop on. IEEE, 1999. [0115] 12. DE 10 2010 013 420 A1 [0116] 13. Rekimoto, Jun, and Masanori Saitoh. "Augmented surfaces: a spatially continuous work space for hybrid computing environments." Proceedings of the SIGCHI conference on Human factors in computing systems: the CHI is the limit. ACM, 1999. [0117] 14. Kurz, D., Hantsch, F., Grosse, M., Schiewe, A., and Bimber, O., Laser-Pointer Tracking in Projector-Augmented Architectural Environments, In Proc. IEEE and ACM International Symposium on Mixed and Augmented Reality (IS-MAR2007), pp. 19-26, Nara, Japan, 2007 [0118] 15. Extend3D (from Website 9 Dec. 2012 http://www.extend3d.de/en/solutions/design/) [0119] 16. Fuchs, Henry, et al. "Augmented reality visualization for laparoscopic surgery." Medical Image Computing and Computer-Assisted Intervention—MICCAI '98 (1998): 934-943. [0120] 17. U.S. Pat. No. 8,172,407 B2 [0121] 18. Andreas Kolb, Erhardt Barth, Reinhard Koch, Rasmus Larsen: Time-of-Flight Sensors in Computer Graphics. Eurographics 2009. [0122] 10. O. Bimber and R. Raskar. Spatial Augmented Reality: Merging real and virtual worlds. A K Peters LTD, 2005. [0123] 11. J. Shotton, A. Fitzgibbon, M. Cook, T. Sharp, M. Finocchio, R. Moore, A. Kipman, A. Blake: Real-Time Human Pose Recognition in Parts from Single Depth Images. Retrieved from http://research.microsoft.com/pubs/145347/BodyPartRecognition.pdf 17 Dec. 2012. [0124] 17. Szymon Rusinkiewicz, Marc Levoy, Efficient Variants of the ICP Algorithm. Third International Conference on 3D Digital Imaging and Modeling [0125] 18. BIMBER, O., WETZSTEIN, G., EMMERLING, A., AND NITSCHKE, C. Enabling view-dependent stereoscopic projection in real environments. In Proc. IEEE and ACM Int. Symposium on Mixed and Augmented Reality. 2005 [126] 19. U.S. Pat. No. 8,150,142 B2 [0127] 20. U.S. Pat. No. 7,433,024 B2 [0128] 21. M. Kortgen, G. Park, M. Novotni, R. Klein: 3D Shape Matching with 3D Shape Contexts. Retrieved from http://cg.tuwien.ac.at/hosting/cescg/CESCG-2003/MKoertgen/paper.pdf, 27 Dec. 2012

The invention claimed is:

1. A method of projecting digital information on a real object in a real environment, comprising:

capturing, by a visible light camera, an image of a real object onto which digital information is projected by a projector;

capturing, by a depth sensor, depth data for the real object at one or more locations on the real object at which the digital information is projected, wherein the depth sensor and the camera are interrelated in a device;

calculating a spatial transformation between the projector and the real object based on the digital information in the image and the depth data corresponding to the projected digital information; and determining calibration data of the projector based on the calculated spatial transformation.

2. The method of claim 1, wherein the digital information comprises a visual pattern having a known geometry.

3. The method of claim 2, further comprising:

estimating intrinsic parameters of the projector based on first coordinates of the visual pattern in a projector coordinate system and second coordinates of the visual pattern in a camera coordinate system.

4. The method of claim 3, further comprising:

estimating a spatial transformation between the visible light camera and the projector based on the estimated intrinsic parameters, wherein the spatial transformation between the projector and the real object is further calculated based on the estimated spatial transformation between the visible light camera and the projector.

5. The method of claim 4, further comprising:

estimating a transformation between the projector and the real object based on the spatial transformation between the projector and the real object and the estimated spatial transformation between the visible light camera and the projector.

6. The method of claim 1, wherein the device is a head mounted device.

7. The method of claim 1, wherein the projector and the visible light camera are not physically coupled.

8. A non-transitory computer readable medium comprising computer readable code projecting digital information on a real object in a real environment, the computer readable code executable by one or more processors to:

capture, by a visible light camera, an image of a real object onto which digital information is projected by a projector;

capture, by a depth sensor, depth data for the real object at one or more locations on the real object at which the digital information is projected, wherein the depth sensor and the camera are interrelated in a device;

calculate a spatial transformation between the projector and the real object based on the digital information in the image and the depth data corresponding to the projected digital information; and determine calibration data of the projector based on the calculated spatial transformation.

9. The non-transitory computer readable medium of claim 8, wherein the digital information comprises a visual pattern having a known geometry.

10. The non-transitory computer readable medium of claim 9, further comprising computer readable code to:

estimate intrinsic parameters of the projector based on first coordinates of the visual pattern in a projector coordinate system and second coordinates of the visual pattern in a camera coordinate system.

11. The non-transitory computer readable medium of claim 10, further comprising computer readable code to:

estimate a spatial transformation between the visible light camera and the projector based on the estimated intrinsic parameters, wherein the spatial transformation between the projector and the real object is further calculated based on the estimated spatial transformation between the visible light camera and the projector.

12. The non-transitory computer readable medium of claim 11, further comprising computer readable code to:

estimate a transformation between the projector and the real object based on the spatial transformation between the projector and the real object and the estimated spatial transformation between the visible light camera and the projector.

13. The non-transitory computer readable medium of claim 8, wherein the device is a head mounted device.

14. The non-transitory computer readable medium of claim 8, wherein the projector and the visible light camera are not physically coupled.

15. A system for projecting digital information on a real object in a real environment, comprising:

one or more processors; and one or more computer readable media comprising computer readable code executable by one or more processors to:

capture, by a visible light camera, an image of a real object onto which digital information is projected by a projector;

capture, by a depth sensor, depth data for the real object at one or more locations on the real object at which the digital information is projected, wherein the depth sensor and the camera are interrelated in a device;

calculate a spatial transformation between the projector and the real object based on the digital information in the image and the depth data corresponding to the projected digital information; and determine calibration data of the projector based on the calculated spatial transformation.

16. The system of claim 15, wherein the digital information comprises a visual pattern having a known geometry.

17. The system of claim 16, further comprising computer readable code to:

estimate intrinsic parameters of the projector based on first coordinates of the visual pattern in a projector coordinate system and second coordinates of the visual pattern in a camera coordinate system.

18. The system of claim 17, further comprising computer readable code to:

estimate a spatial transformation between the visible light camera and the projector based on the estimated intrinsic parameters, wherein the spatial transformation between the projector and the real object is further calculated based on the estimated spatial transformation between the visible light camera and the projector.

19. The system of claim 15, wherein the visible light camera and the depth sensor are comprised in a head mounted device.

20. The system of claim 15, wherein the projector and the visible light camera are not physically coupled.

* * * * *